US009110355B1

(12) United States Patent
Nourbakhsh (10) Patent No.: US 9,110,355 B1
(45) Date of Patent: Aug. 18, 2015

(54) EXTERNAL FLASH DEVICE FOR MOBILE ELECTRONIC DEVICES

(71) Applicant: BBY SOLUTIONS, INC., Richfield, MN (US)

(72) Inventor: Farhad Nourbakhsh, Apple Valley, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 14/323,650

(22) Filed: Jul. 3, 2014

(51) Int. Cl.
*G03B 15/05* (2006.01)

(52) U.S. Cl.
CPC ...................................... *G03B 15/05* (2013.01)

(58) Field of Classification Search
CPC ........................................................ G03B 15/05
USPC .................................. 396/164, 171, 182, 198
See application file for complete search history.

(56) References Cited

U.S. PATENT DOCUMENTS

| 4,252,426 | A | * | 2/1981 | Kuraishi | 396/28 |
|---|---|---|---|---|---|
| 4,368,966 | A | * | 1/1983 | Hagyuda | 396/171 |
| 4,492,451 | A | * | 1/1985 | Maassen et al. | 396/162 |
| 5,678,075 | A | * | 10/1997 | Doukas | 396/171 |
| 5,895,128 | A | * | 4/1999 | Kishimoto et al. | 396/61 |
| 5,974,273 | A | * | 10/1999 | Larkin et al. | 396/162 |
| 6,704,500 | B2 | * | 3/2004 | Takematsu | 396/28 |
| 6,749,310 | B2 | | 6/2004 | Pohlert et al. | |
| 6,795,647 | B2 | * | 9/2004 | Iwasaki et al. | 396/56 |
| 6,824,283 | B2 | | 11/2004 | Pohlert et al. | |
| 6,948,823 | B2 | | 9/2005 | Pohlert et al. | |
| 7,140,742 | B2 | | 11/2006 | Pohlert et al. | |
| 7,163,302 | B2 | | 1/2007 | Pohlert et al. | |
| 7,318,652 | B2 | | 1/2008 | Pohlert et al. | |
| 7,331,681 | B2 | | 2/2008 | Pohlert et al. | |

(Continued)

FOREIGN PATENT DOCUMENTS

| CN | 202472201 U | 10/2012 |
|---|---|---|
| JP | 2005-221595 A | 8/2005 |

(Continued)

OTHER PUBLICATIONS

"Concepter—From concepts to products", [online]. Retrieved from the Internet: <URL: http://iblazr.com/presentation_concepter.pdf>, (2014), 9 pgs.

(Continued)

*Primary Examiner* — W B Perkey
(74) *Attorney, Agent, or Firm* — Schwegman Lundberg & Woessner, P.A.

(57) ABSTRACT

Described herein are various configurations and designs for an external flash device. The external flash device can attach to a camera device, such as a mobile phone or smartphone, to provide enhanced flash performance to an internal flash of the camera device. An adjustable arm of the external flash device can include a sensor positionable to receive an optical transmission, such as a flash from the camera device. The adjustable arm can allow the external flash to function with various camera devices. In response to receiving and detecting the optical transmission, the external flash can activate one or more light emitting units to generate a flash that is synchronized with the capture of an image by the camera. One or more light emitting arrays can be included in the external flash to provide greater flash brightness or more than one color temperature of light emitting units.

23 Claims, 7 Drawing Sheets

(56) References Cited

U.S. PATENT DOCUMENTS

| | | | |
|---|---|---|---|
| 7,372,499 B2* | 5/2008 | Kawakami | 348/370 |
| 7,429,117 B2 | 9/2008 | Pohlert et al. | |
| 7,510,290 B2 | 3/2009 | Pohlert et al. | |
| 8,160,435 B2 | 4/2012 | Okubo | |
| 2010/0134679 A1 | 6/2010 | Lin | |
| 2012/0282977 A1 | 11/2012 | Haleluk | |
| 2013/0120636 A1 | 5/2013 | Baer | |
| 2013/0278552 A1 | 10/2013 | Kamin-Lyndgaard | |

FOREIGN PATENT DOCUMENTS

| | | |
|---|---|---|
| JP | 2008-286935 A | 11/2008 |
| WO | WO-2004080056 A1 | 9/2004 |
| WO | WO-2013154857 | 10/2013 |

OTHER PUBLICATIONS

"Cyanics—iFlash LED Camera and Video Flash Apple iPhone 4S, 4, 3GS", [online}. Retrieved from the Internet: <URL: http://www.cyanics.net/products/iflash-led-camera-and-video-flash-apple-iphone-4s-4-3gs-color-black>, (2015), 5 pgs.

"iblazr—The LED Flash for Smartphones and Tablets by iblazr lab—Kickstarter", [online]. [archived on May 4, 2014]. 03https://web.archive.org/web/20140504020910/https://www.kickstarter.com/projects/iblazr/iblazr-the-led-flash-for-smartphones-and-tablets, (May 2014), 20 pgs.

"iFlash: Camera flash for iPhone and iPod Touch", [online]. (c) MAS Media Inc. [retrieved on Dec. 2, 2010]. Retrieved from the Internet: <URL: http://dailyiphoneblog.com/2010/12/02/iflash-camera-flash-for-iphone-and-ipod-touch/>, (Dec. 2, 2010), 4 pgs.

"iPhone and external flash gun", [online]. (c) 2013 Autodesk Inc. [archived on Dec. 6, 2013}. Retrieved from the Internet: <URL: https://web.archive.org/web/20131206150922/http://www.instructables.com/id/iPhone-and-external-flash-gun/>, (2013), 3 pgs.

"KLYP Instruction Manual", (c) 2012 Manfrotto Bassano Italy, (2012), 36 pgs.

"Lightstrap is a ring flash for your iPhone", [online]. [archived on Dec. 11, 2013]. Retrieved from the Internet: <URL: https://web.archive.org/web/20131211003723/http://connect.dpreview.com/post/6290119215/lightstrap-ring-flash-iphone-accessory?>, (Dec. 7, 2013), 4 pgs.

"Nova: the wireless flash for better iPhone & Android photos", [online]. (archived on Jan. 7, 2014). Retrieved from the Internet: <URL: https://web.archive.org/web/20140107175253/http://www.kickstarter.com/projects/joewalnes/nova-a-slim-wireless-flash-for-better-iphone-photo>, (2014), 22 pgs.

"Sony Ericcson Phone Flash MPF-10", [online] (c) 1996-2015, Amazon.com, Inc. Retrieved from the Internet: <URL: http://www.amazon.com/Sony-Ericsson-Phone-Flash-MPF-10/dp/B0001NDINW>, (2014), 3 pgs.

"UXOOL Flash—First Ever LED Camera Flash for Apple iPhone 3GS 3G—Now You Can Shoot in the Dark!", [online]. (c) 1996-2012, Amazon.com, Inc. [archived on May 15, 2012]. Retrieved from the Internet: <URL: https://web.archive.org/web/20120515073452/http://www.amazon.com/UXOOL-Flash-Camera-iPhone-Package/dp/B004W3WEN2>, (2012), 4 pgs.

Selby, David A., "How to use off-camera flash with an iPhone 4", [archived on Sep. 19, 2014]. Retrieved from the Internet: <URL: https://web.archive.org/web/20140919145701/http://www.lightingrumours.com/how-to-use-off-camera-flash-with-an-iphone-4-2063#.VOeeqU05Dcs>, (Apr. 30, 2012), 7 pgs.

Thomas, Joshu, "External Flash for iPhone Camera—iBlazr", [online]. [archived on Apr. 4, 2013]. Retrieved from the Internet: <URL: https://web.archive.org/web/20130904212500/http://www.hippiemonk.com/external-flash-for-iphone-camera-iblazr/2452/>, (Jul. 2, 2013), 5 pgs.

* cited by examiner

EXTERNAL FLASH DEVICE FOR MOBILE ELECTRONIC DEVICES

TECHNICAL FIELD

Embodiments pertain to an external flash device for use with mobile electronic devices such as smartphones that include a camera and an integrated flash. Some embodiments relate to structures and programming logic for activating a light emitting array of the external flash in response to the light emissions from the mobile device.

BACKGROUND

Existing camera devices, such as cameras incorporated into mobile phones, have limited flash capabilities. Some of the limitations of existing flash capabilities include insufficient brightness to adequately capture certain image environments and a flash that emits a color temperature that does not compliment the color temperature of the image subject. Supplemental flash devices have been developed to address some of these limitations; however, such devices include undesirable characteristics as well. Some supplemental flash devices draw power from the camera device to which they attach, reducing the battery life of the camera device. Other flash devices are not in communication with the camera device, so the flash must be turned on and remain on until the image is captured, draining battery life at a high rate. In addition, many flash devices are configured to function with a single camera device model or form factor, and cannot function with other camera devices or later releases of the same device.

DETAILED DESCRIPTION

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Described herein are various configurations and designs for a self-powered light emitting unit, further referred to as an external flash device. The external flash device can attach to a camera device, such as a mobile phone, to provide enhanced flash performance to the internal camera flash of the camera device. An adjustable arm of the external flash device can include a sensor that receives an optical transmission (e.g., a flash emitted from the camera device). In response to receiving and detecting the optical transmission, the external flash device can activate one or more light emitting elements, such as to generate a flash that is synchronized with the capture of an image by the camera device.

In order to capture the optical transmission from the internal or built-in flash of the camera device, the arm of the external flash can be positioned over the flash unit offered by the camera device. In an example, the arm can be positioned within such close proximity to the internal camera flash that the optical sensor on the arm captures most of the internal camera flash transmission and a minimal amount of light from other sources. In another example, the adjustable arm facilitates attachment of the external flash to a variety of camera devices. The diversity of camera device form-factors may require the external flash to be attached to the device in a variety of locations relative to the internal camera flash of the camera device. The adjustable arm can accommodate many of these form-factors by allowing adjustment of the position of the sensor to be placed over the internal camera flash of the camera device, such as by translating or rotating the arm. In a further example, the arm can be low profile such that the arm and the external device avoid the viewing angle of the camera lens.

Flash arrays that are internal or otherwise integrated to the camera device can have several limitations, for example, as a result of size and power consumption requirements. Some limitations can include an insufficient number of light emitting units leading to reduced brightness. Other limitations can include a reduced spectrum of flash color or high battery consumption rates.

In an example, the external flash device can include one or more light emitting arrays, such as a Light Emitting Diode (LED). The external flash device can provide greater flash brightness than the camera's internal camera flash by providing a plurality of light emitting arrays or by providing larger light emitting arrays. Greater brightness can be desirable for taking pictures in low light conditions. In another example, the external flash device can include more than one color of light emitting unit, such as to produce a flash to match or supplement the color temperature of ambient background light.

The external flash device can include a power source independent of the camera device, such as the inclusion of a replaceable battery. This can be beneficial in that the camera device's battery power is not consumed by the external flash device. Battery life is conserved by only emitting the camera's built-in flash in sync with the image capture by the camera, rather than relying on the user turning the external flash on or off manually.

In one or more examples, the external flash device can include a microprocessor configured to interpret the optical transmission from the camera's internal camera flash and apply settings for the external flash device in response to the transmission. The camera device can include a software application configured to cause communications with the external flash by way of emitted optical signals from the built-in flash unit in order to produce the desired external flash settings that are received and processed by the external flash device. For example, the flash settings can be indicated by the number, length, and sequence of the internal camera flash emissions to cause a particular optical transmission to the external flash.

Figure 1:
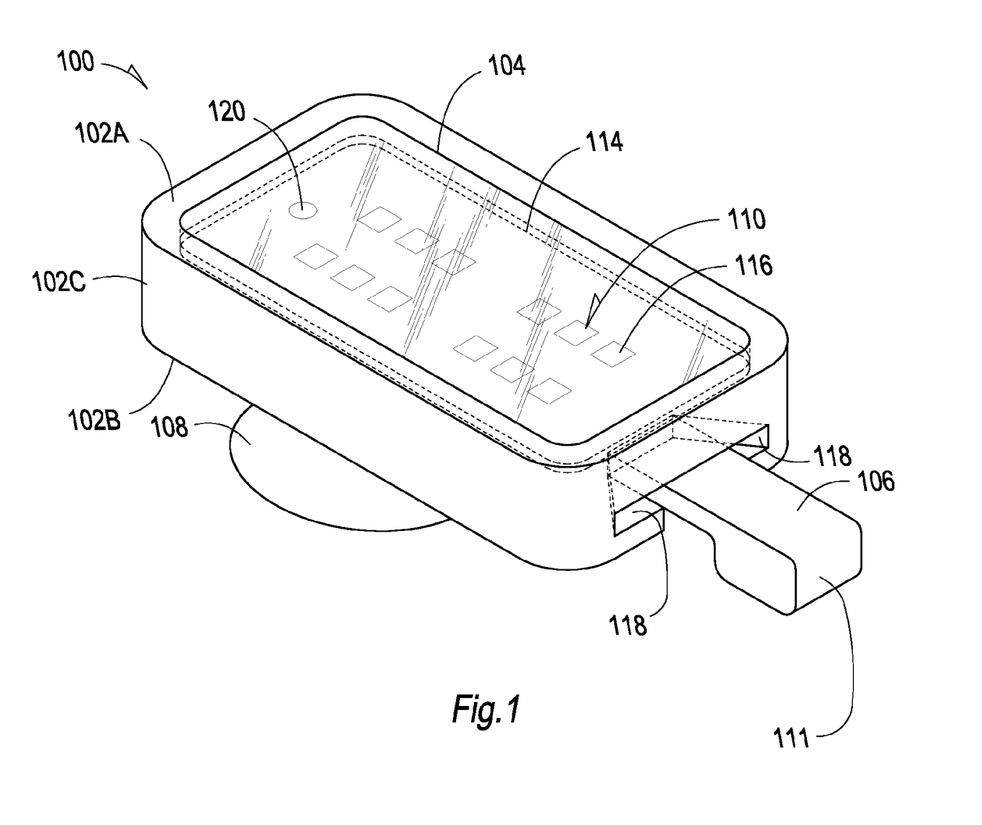
FIG. 1 illustrates a perspective view of an external flash device, according to an example described herein.

FIG. 1 illustrates an example of an external flash device 100, such as an external flash device 100 including an adjustable arm 106. The external flash device 100 can include a housing 102, a light emitting array 110, a lens 104, an adjustable arm 106, and an attachment member 108. The light emitting array 110 can become energized to produce a flash, such as for illuminating a scene for enhancing image quality of a photo. The housing 102 can support the light emitting array 110 and lens 104. The lens 104 can protect the light emitting array 110 from impact and debris while permitting the flash emitted from the light emitting array 110 to pass therethrough. The lens 104 can be attached to the housing 102, for example, by adhesive or the lens 104 can be molded into the housing 102. (As further depicted in FIG. 1, a reflector 114 can surround the light emitting array 110, such as to focus (e.g., shape the resulting light emission into a wide or narrow beam) the flash towards the intended subject of an image. The reflector 114 can be positioned between the lens 104 and the housing 102.) The external flash device 100 can include an attachment member 108 for attaching the external flash device 100 to a camera device, such as a mobile phone that includes a camera and an integrated flash. In an example, the attachment member 108 can be coupled to the bottom housing surface 102B of the external flash device 100. The attachment member 108 can couple the external flash device 100 to the camera device in a permanent or non-permanent fashion.

The camera device may only have select locations for attaching the external flash device 100. A sensor can be located on the adjustable arm 106 for detecting light from the internal camera flash of the camera device. The adjustable arm 106 can extend from the housing 102, such as to position the arm over the flash of the camera device. The adjustable arm 106 can be attached to the housing 102 and configured to move relative to the housing, such as to translate outwardly away from the housing 102 or to rotate about a hinge to position the arm at a different trajectory from the housing 102.

The light emitting array 110 can include one or more light emitting units 116, such as one or more LEDs, xenon tubes, or other light sources. The light emitting array 110 can include any number of light emitting units 116 (e.g., multiple LED emitters). In an example, FIG. 1 depicts twelve LED emitters arranged in a light emitting array 110. The light emitting units 116 can be configured to transmit light with various properties, such as brightness level, color temperature, and viewing angle. In an example, to illuminate objects relatively far from the camera, the light emitting unit 116 can increase the light output (e.g., by increasing light output of the LED array with brightness levels of up to 500 lumens). In some examples, to illuminate objects relatively far from the camera, the external flash device 100 can reduce the divergence of light emerging from the light emitting units 116. For instance, the external flash device 100 can include a focusing element between the LED array and the object. In some examples, the focusing element can be a lens, such as simple lens having two smooth, refractive surfaces. In other examples, the focusing element can be a Fresnel lens or a diffractive element.

The color temperature emitted from the light emitting unit 116 can be 3000 Kelvin (K), 5000K, 7000K, or other visible and non-visible color temperatures. The color temperature of the flash can be matched to the ambient color temperature of the scene being captured by the photo, such as to capture a warmer image or a brighter image. Each light emitting unit 116 within the light emitting array 110 can include different properties than the other units, such as to provide the light emitting array 110 with a variety of brightness or color temperature options that can be controlled by settings of the external flash device 100.

In some examples, the external flash device 100 can include a supplemental optical sensor 120. The supplemental optical sensor 120 can be optionally included within the housing 102 or positioned on the adjustable arm 106. The supplemental optical sensor may reside next to the light emitting array 110 in the light cavity, for example, and operate to measure the ambient light facing the camera. In further examples, the supplemental optical sensor 120 may provide a measurement only when the light emitting array 110 is inactive.

The lens 104 can be fabricated from a transparent or translucent material (e.g., polycarbonate), such that the lens 104 does not diminish brightness or alter the color of the flash. In an example, the lens 104 can be fabricated from a scratch resistant material, such as glass, or a polymer with a scratch resistant coating. The lens 104 can include one or more sections, each section including an oblique prism, such as a Fresnel lens or other diffractive element. Additionally or alternatively, the lens 104 can focus the light emitted from the light emitting array 110, such as into a wide or narrow beam. A section of the lens 104 can be configured to focus ambient light on to the supplemental optical sensor 120. In another example, the lens 104 can be removable from the housing 102, such as to permit a user to exchange the lens 104, for example, with a new lens 104 or a lenses 104 with various focal properties.

The housing 102 can be sized and shaped in any form factor suitable for attachment to a camera device. In an example, the housing 102 can be primarily rectangular as shown in FIG. 1; however, the external flash device 100 could be oval, circular, or some other shape. The housing 102 can include a top housing surface 102A, a bottom housing surface 102B, and a side housing surface 102C (collectively referred to as housing 102 in this disclosure). The top housing surface 102A can be configured for attaching a lens 104 through which the viewing angle of the light emitting array 110 can be directed. The housing 102 can extend between the top housing surface 102A and bottom housing surface 102B to form the side housing surface 102C. To accommodate movement of the adjustable arm 106, at least one side of the side housing surface 102C can include channels 118 that permit the arm to pivot in at least one direction. In an example, FIG. 1 depicts two angular channels 118 positioned on either side of the adjustable arm 106. In another example, the housing could include a conical feature, such as to accommodate a ball-joint hinge of the adjustable arm 106 that could rotate in any number of directions. One of ordinary skill in the art would appreciate that the external flash device 100 together with the housing 102 can be fabricated from a number of materials including a polymer or metal.

Figure 2:
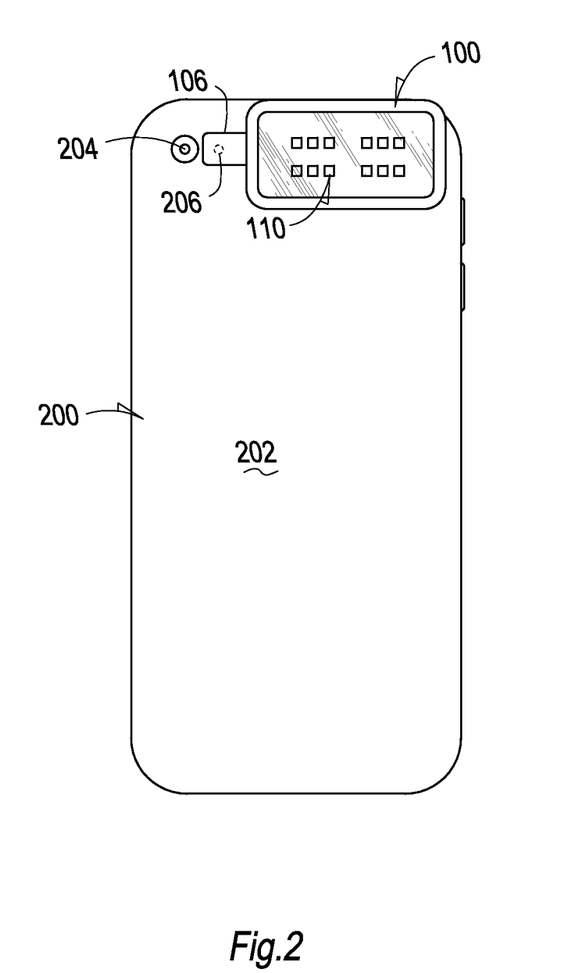
FIG. 2 illustrates a subject's view of the external flash device attached to a camera device, according to an example described herein.

FIG. 2 illustrates an example of the external flash device 100 coupled to a camera device 200, such as a mobile phone with an internal camera and flash. In another example, the camera device 200 can be a tablet computer, e-reader, or other portable camera device 200. The external flash device 100 can be affixed (e.g., coupled) to a surface 202 of the camera device 200 that includes an image sensor 204 and an internal camera flash 206. The external flash device 100 can be positioned and attached in the proximity of the internal camera flash 206 (e.g., as shown in FIG. 2). The adjustable arm 106 can be placed over the internal camera flash 206, such as to place the optical sensor included in the adjustable arm 106 in a position to detect the activation of the internal camera flash 206. The adjustable arm 106 can be positioned in a variety of configurations. The external flash can be a universal flash device, for example, the external flash device 100 can be communicatively attached to a large number of camera devices 200.

In some instances the external flash device 100 cannot be positioned in certain locations on the camera device 200. In an example, the surface of the camera device 200 may be curved near the edge of the surface 202 of the camera device 200, such as to prevent the attachment member 108 from securing the external flash device 100 to the camera device 200.

Figure 3:
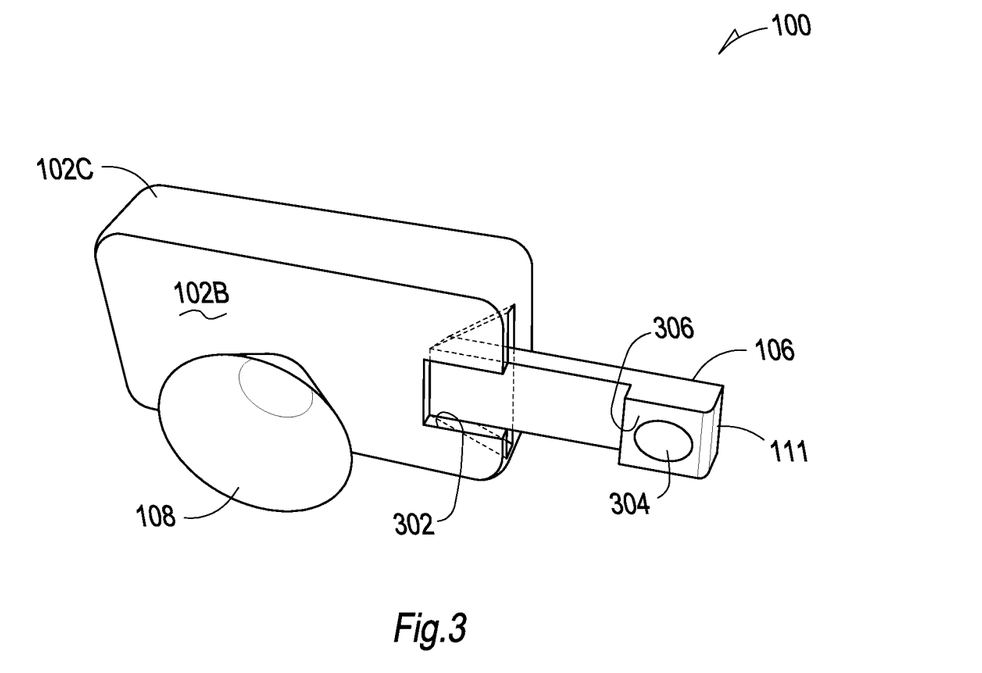
FIG. 3 illustrates a perspective view of the attachment and sensor side of the external flash device, according to an example described herein.

FIG. 3 illustrates an example of the external flash device 100 depicted from the perspective of the bottom 102B of the housing 102. Coupled to the housing bottom 102B is the attachment member 108. The attachment member 108 can include a suction cup as shown. In another example, the attachment member 108 can include a reusable adhesive, or the attachment member 108 could be configured to couple the external flash device 100 and the camera device 200 magnetically. In a further example, hook and loop fabric could be attached to both the external flash device 100 and the camera device 200.

The adjustable arm 106 can be positioned in a retracted position or an extended position. In the retracted position, the distal end 111 of the adjustable arm 106 can be located flush with the side housing surface 102C. The retracted position of the adjustable arm 106 can be useful for storing the external flash device 100 or for positioning the optical sensor closer to the center of the external flash device 100. The housing 102 can include a pocket 302, such as to allow the adjustable arm 106 to fully retract into the housing. In an example, the distal end 111 of the adjustable arm 106 can be positioned flush with the side housing surface 102C.

The adjustable arm 106 can pivot to a position off-center of the external flash device 100. The external flash device 100 can be positioned such that the internal camera flash 206 of the camera device 200 is not aligned with the axis of the external flash device 100 as a result of the pivoting ability of the adjustable arm 106. In a further example, the adjustable arm 106 can pivot about more than one axis, such as towards or away from the lens 104 or from side to side. Multi-axis pivoting of the adjustable arm 106 can be useful if the internal camera flash 206 of the camera device 200 is raised from the surface 202 of the camera device 200. The adjustable arm 106 can then pivot accordingly to be positioned over the internal camera flash 206, regardless of any surface differential. In another example, the adjustable arm 106 can be hingedly attached to the housing 102 by a ball joint connection. A ball joint configuration of the adjustable arm 106 can allow positioning of the adjustable arm 106 about more than one axis simultaneously. In a further example, the adjustable arm 106 can be a flexible member, such as a wire or an articulated sleeve. The adjustable arm 106 could be positioned by the user such that the arm requires further user manipulation to re-position the arm. In other words, the adjustable arm 106 can retain its shape once positioned by the user.

The arm can include an optical sensor 304, such as a photodiode, a Charge-Coupled Device (CCD), a Complementary Metal-Oxide-Semiconductor (CMOS), or other silicone die optical sensor. The optical sensor 304 can detect an optical transmission (e.g., light emitted by flash activation) from the internal camera flash 206 of the camera device 200. The optical sensor 304 can be located on the bottom surface 306 of the adjustable arm 106. In an example, the optical sensor 304 can transmit an electrical signal to circuitry or a microprocessor of the external flash device 100. The circuitry or microprocessor of the external flash device 100 can activate the light emitting array 110 (e.g., generate a flash) in response to receiving the optical transmission.

Figure 4:
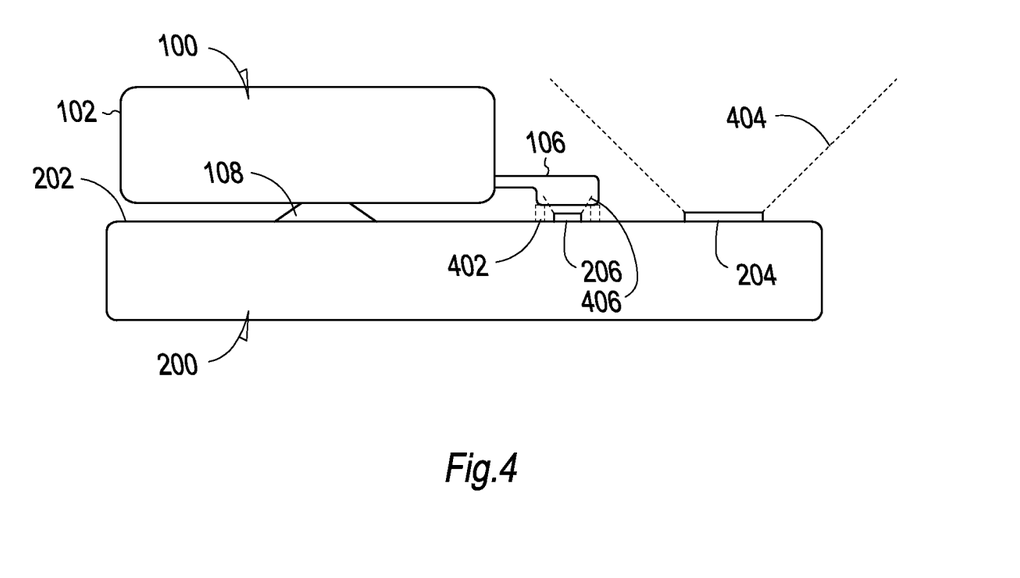
FIG. 4 illustrates a top-down view of the external flash device attached to a camera device, according to an example described herein.

FIG. 4 illustrates an example of a top-down view of the external flash device 100 coupled to a camera device 200, such as by attachment member 108. The optical sensor 304 can be positioned over the internal camera flash 206, such that the optical sensor 304 positioned within an illuminated area 406 of the internal camera flash 206. The external flash device 100 can be positioned outside of the field of view 404 of the image sensor 204 of the camera device 200. In an example, the adjustable arm 106 can be configured to have a low-profile, such as to allow the optical sensor 304 of the external flash device 100 to be positioned over the image sensor 204 of the camera device 200 without the adjustable arm 106 or the housing 102 to be within the field of view 404 of the image sensor 204. The extension of the adjustable arm 106 can permit the housing 102 of the external flash device 100 to be placed at a sufficient distance from the image sensor 204, such that the external flash device 100 is outside of the field of view 404 of the image sensor 204.

The adjustable arm 106 can include a shield 402 to surround the internal camera flash 206 of the camera device 200. The shield 402 can prevent light, other than from the internal camera flash 206, from reaching the optical sensor 304, such as ambient light from the user's nearby surroundings, flashes from other camera devices, or other light sources. The shield 402 can be formed from an opaque or semi-opaque material, such as to prevent the accidental actuation of the external flash 100 by light from sources other than the internal camera flash 206. The shield 402 can be coupled to the external flash device 100, such as coupled to the adjustable arm 106. The shield 402 can be sized and shaped to surround the optical sensor 304 within illumination area 406 of the internal camera flash 206, such as a ring with an opening for the optical sensor 304. In an example, the shield 402 can extend from the adjustable arm 106 to the camera device 200. The material of the shield 402 can be compliant, such as to form to the shape of the surface 202 of the camera device 200. In an example, the shield 402 could be a foam pad affixed to the adjustable arm 106 by adhesive. In another example, the shape of the shield 402 can be configured to be compliant.

Figure 5:
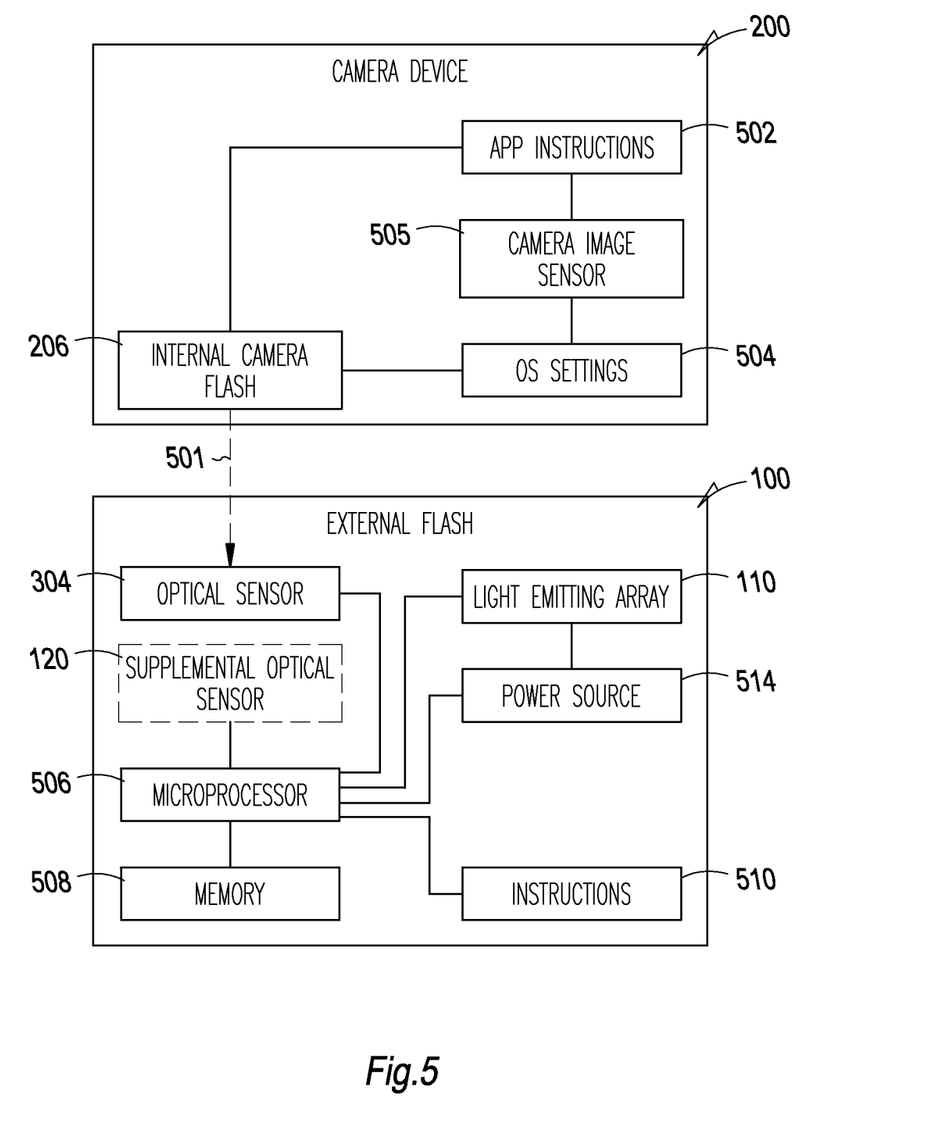
FIG. 5 illustrates a block diagram of the external flash device and select elements of a camera device, according to an example described herein.

FIG. 5 illustrates a block diagram of an example external flash device 100 coupled to a camera device 200 providing an internal camera flash 206 and a camera image sensor 505. The external flash device 100 can include an optical sensor 304, a power source 514, a microprocessor 506, a memory device 508 with instructions 510 stored thereon, and a light emitting array 110. The external flash device 100 can be configured to activate a light emitting array 110 in response to receiving an optical transmission 501 from a camera device 200. The optical sensor 304 of the external flash device 100 can receive the optical transmission 501 from the camera device 200, such as from the internal camera flash 206 of the camera device 200. The internal camera flash 206 can be actuated (e.g., triggered in response to user input) by the camera device 200, such as by the operating system settings 504 of the camera device 200 or by instructions from an application (e.g., mobile app) running on the camera device 200.

In some examples, the camera device 200 includes operating system settings 504 or instructions 502 from a software application (app instructions) can send or otherwise trigger an optical transmission 501, such as a coded optical transmission. The coded optical transmission can communicate flash settings to be used by the external flash device 100. In an example, the optical transmission 501 can be transmitted in a pattern, (either at a predetermined time, or immediately before the camera image sensor 505 captures the image) with use of a sequence of flashes (e.g., combinations of flashes in a sequence of long or short duration, such as an 8-bit compact digital code that would allow for up to 256 different modes) triggered by the internal camera flash 206 for receipt and processing by the external flash device 100.

The optical sensor 304 of the external flash device 100 can transmit a signal to a microprocessor 506 based on the optical transmission 501. The microprocessor 506 can be configured to execute instructions, such as activate a light emitting array 110 in response to detecting an optical transmission 501 from a camera device 200. Instructions 510 and like microprocessor logic for receiving and decoding the optical transmission 501 and activating the light emitting array 110 can be stored on the internal memory device 508 of the external flash device 100. The microprocessor 506 can activate one or more light emitting units 116 of the light emitting array 110 based on the instructions 510. The instructions 510 can include one or more flash settings, such as settings communicated to the external flash device 100 from the optical transmission 501.

The power source 514 can include a battery, such as a lithium-ion, lithium-polymer, alkaline, nickel-cadmium, nickel-metal-hydride, or other. The power source 514 can be re-chargeable or replaceable (e.g., user can exchange depleted batteries with fully charged batteries). The power source 514 can be a dedicated power source (e.g., internal battery) for the external flash device 100. A dedicated power source 514 independent of another device can be beneficial in that the battery power of the camera device 200 is not consumed by the external flash device 100. In an example, the power source 514 can include an electrical connection to a power source of another device, such as camera device 200, or a wall-mounted Alternating Current (AC) adapter. The electrical connection can be a wired attachment through a charging port of the camera device 200, such as a Micro-USB port or an audio jack. The external flash device 100 can use the power source of the other device for operation or to charge the power source 514.

The supplemental optical sensor 120 can be communicatively coupled to the microprocessor 506, such as to communicate sensor input to the microprocessor 506. The microprocessor 506 can determine flash settings that are to be used by the external flash device 100 based on input from the supplemental optical sensor 120. In an example, the supplemental optical sensor 120 can detect ambient light conditions of an image subject or other ambient light conditions present for operation of the external flash device 100. The supplemental optical sensor 120 can be inactive (not detecting input) while the light emitting array 110 is activated (emitting light), such as to prevent the supplemental optical sensor 120 from detecting the flash from the light emitting array 110. The microprocessor 506 can determine which flash settings to use based on the ambient light conditions detected by the supplemental optical sensor 120.

In a further example, the external flash device 100 can include a switch (not shown) for setting a mode of the external flash device 100, such as ON, OFF, or Auto. The external flash can be turned to the OFF mode for conserving battery power or when activation of the external flash device 100 is not desired. The light emitting array 110 can be activated and remain activated (e.g., for providing a prolonged light source when capturing video with the camera device 200) when the switch is set to the ON mode. Alternatively, the switch can be set to the Auto mode, such as the external flash device 100 will only activate based on an optical transmission 501 from the internal camera flash 206 of the camera device 200.

The external flash device 100 can activate one or more light emitting units 116 based upon the input described above (e.g., instructions 502 from the camera device 200, optical sensor 304, supplemental optical sensor 120, or instructions 510). The structure described in this disclosure can facilitate the external flash device 100 in performing the various techniques discussed below.

Figure 6:
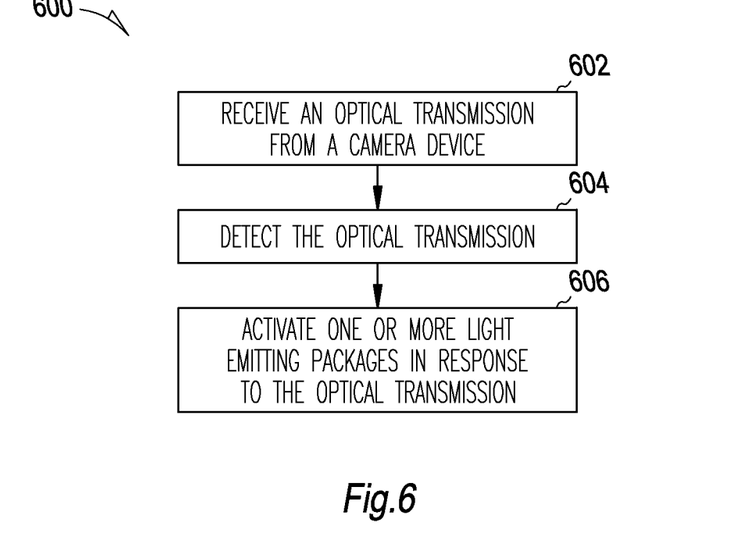
FIG. 6 is a flow chart of a method of using the external flash device, according to an example described herein.

FIG. 6 illustrates a block diagram of an example flow chart of a method 600 of using the external flash device 100 wherein the flash settings are applied in response to an optical transmission 501 from a camera device 200.

At 602, the external flash device 100 can receive an optical transmission 501 from a camera device 200. In an example, the optical transmission 501 can be emitted from an internal camera flash 206 of a camera device 200. The external flash device 100 can receive the optical transmission 501 through an optical sensor 304. In an example, the optical sensor 304 can be a photodiode, CCD, CMOS, or other silicone die optical sensor.

At 604, the external flash device 100 can detect the optical transmission 501. The optical sensor 304 can transform the energy detected from the optical transmission 501 into an electrical signal. The optical sensor 304 can be electrically coupled to circuitry of the external flash device 100, such as the circuitry can receive the electrical signal from the optical sensor 304. The circuitry can be configured to perform various operations, such as activate one or more light emitting units 116 of the light emitting array 110 in response to the detection of a particular optical transmission 501 (e.g., a flash triggered from internal flash 206 of the camera device 200).

At 606, the external flash device 100 can activate one or more light emitting units 116 in response to the optical transmission 501. The activation of the light emitting array 110 can be powered by the power source 514. The circuitry can be configured to activate one or more light emitting units 116 of the light emitting array 110. In an example, the circuitry can be configured to activate all of the light emitting units 116 in the light emitting array 110. The external flash can activate the light emitting units 116 in response to any optical transmission 501 without regard to a specific optical transmission signal (e.g., coded transmission). The activation of the one or more light emitting units 116 can be synchronized with the image capture of the camera device 200, such as the activation of the one or more light emitting units 116 that occurs within a specified time of the image capture of the camera device 200.

In another example, the light emitting array 110 can be activated to output a series of light emitting pulses, such as a strobe effect. The strobe effect can be used with a camera device 200 that is capturing a series of images (e.g., to capture a series of images of a moving object). Likewise, other flash effects such as red-eye reduction may also be performed with the use of a flash sequence providing a strobe of multiple flashes.

In another example, the circuitry can be configured to activate one or more light emitting units 116 that have a specific emission brightness value, such as in response to a particular electrical signal from the optical sensor 304. The particular electrical signal can be generated from a coded optical transmission 501 (e.g., a number of flashes, such as two, three, etc. . . . or a specific duration of the flash) form the internal camera flash 206 of the camera device 200.

In a further example, the circuitry can be configured to activate one or more light emitting units 116 that have a specific color temperature, such as in response to a particular electrical signal (e.g., a different electrical signal than used to set the brightness level).

Figure 7:
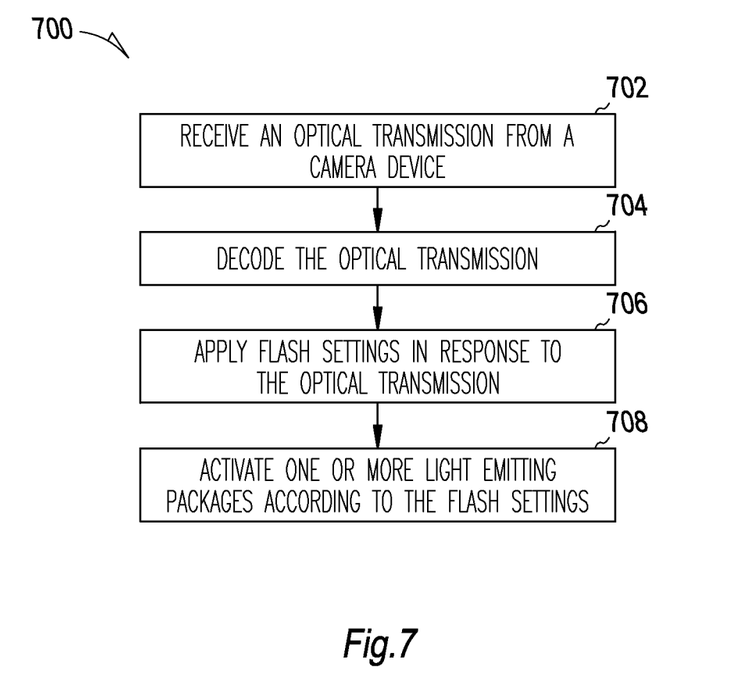
FIG. 7 is a flow chart of a method of using the external flash device wherein certain flash settings are applied in response to an optical transmission from a camera device, according to an example described herein.

FIG. 7 illustrates a block diagram of an example flow chart of a method 700 of using the external flash device 100 wherein the flash settings are applied in response to an optical transmission 501 from a camera device 200.

At 702, the external flash device 100 can receive an optical transmission 501 from a camera device 200. As previously discussed, the optical transmission 501 can be emitted from an internal camera flash 206 of a camera device 200. The external flash device 100 can receive the optical transmission 501 through an optical sensor 304.

At 704, the external flash device 100 can decode the optical transmission 501. The external flash device can include a microprocessor 506, such as a general-purpose microprocessor or a single-purpose microprocessor. The microprocessor 506 can be coupled to the memory device 508, such as a non-transitory computer readable medium, with instructions 510 programmed thereon configured to perform operations in response to the electrical signal generated from the optical sensor 304. The microprocessor 506 can decode the optical transmission 501 based on the instructions 510. In an example, an optical transmission 501 may encode a specific set of external flash device settings (e.g., flash brightness, color temperature, timing, etc.). The microprocessor 506 can be configured to perform instructions 510 that interpret and implement the optical transmission 501.

At 706, the external flash device 100 can apply flash settings in response to the optical transmission 501. The microprocessor 506 can be configured to perform a variety of operations in response to decoding 704 the optical transmission 501. In an example, the microprocessor 506 can follow instructions 510 to activate one or more light emitting units 116 with the properties (e.g., brightness, color temperature, etc.) specified by the optical transmission 501.

At 708, the external flash device 100 can activate one or more light emitting units 116 according to the flash settings. In an example, the microprocessor 506 can perform instructions 510 to activate one or more light emitting units 116, such as activating all of the light emitting units 116 in the light emitting array 110. The activation of the light emitting array 110 can be powered by the power source 514. The microprocessor 506 can be configured to activate one or more light emitting units 116 of the light emitting array 110. In an example, the microprocessor 506 can be configured to activate all of the light emitting units 116 in the light emitting array 110. The external flash can activate the light emitting units 116 in response to any optical transmission 501 without regard to a specific optical transmission signal (e.g., coded transmission). The activation of the one or more light emitting units 116 can be synchronized with the image capture of the camera device 200, such as the activation of the one or more light emitting units 116 occurs within a specified time of the image capture of the camera device 200.

In another example, the light emitting array 110 can be activated in a series of light emitting pulses, such as a strobe effect. The strobe effect can be used with a camera device 200 that is capturing a series of images (e.g., to capture a series of images of a moving object).

In another example, the microprocessor 506 can be configured to activate one or more light emitting units 116 that have a specific emission brightness value, such as in response to a particular electrical signal from the optical sensor 304.

In a further example, the microprocessor 506 can be configured to activate one or more light emitting units 116 that have a specific color temperature, such as in response to a particular electrical signal (e.g., a different electrical signal than used to set the brightness level).

Figure 8:
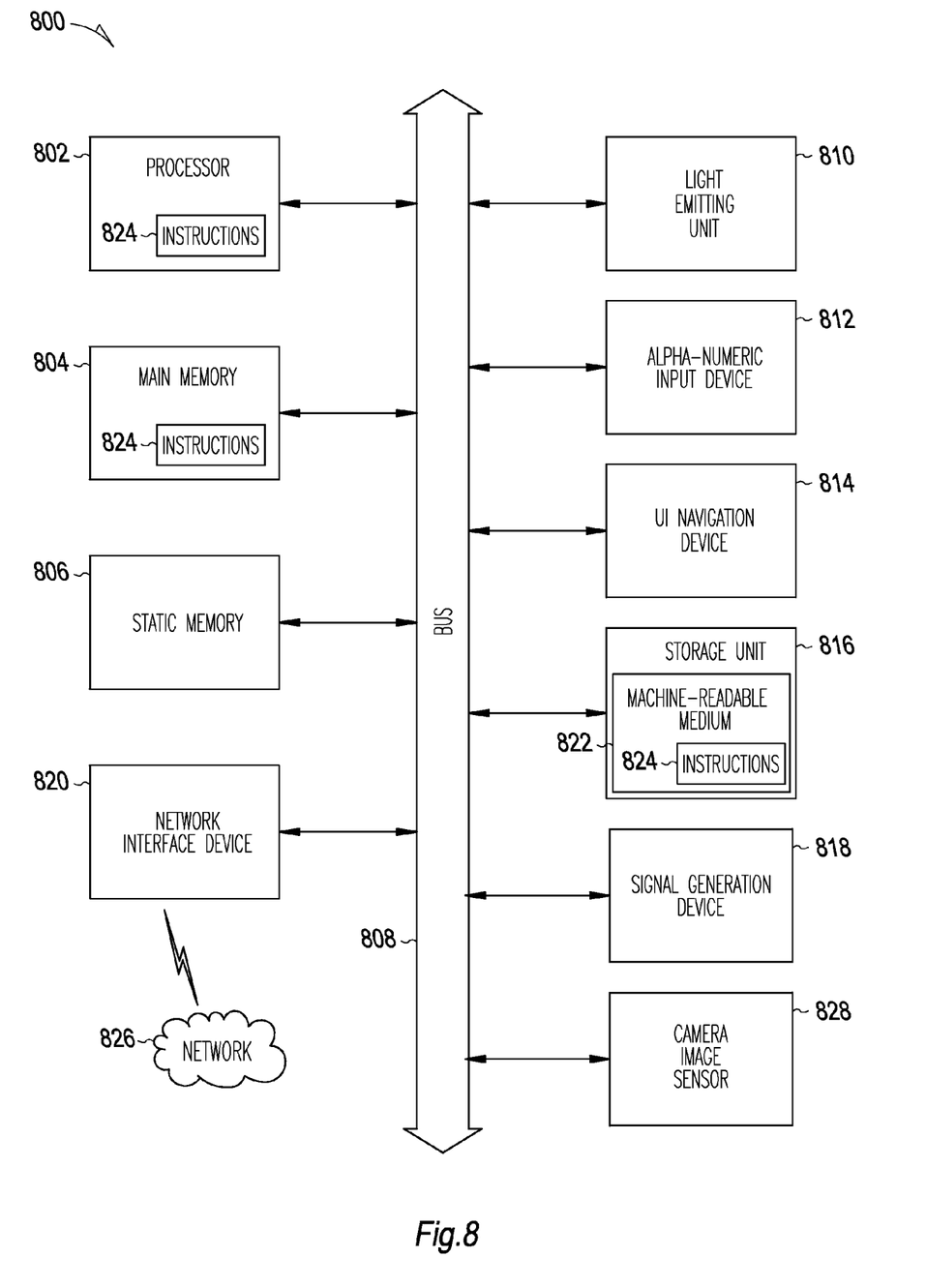
FIG. 8 is a block diagram illustrating a camera device upon which any one or more of the methodologies herein discussed may be run.

FIG. 8 is a block diagram illustrating computing processing components of a generic camera device 800 (e.g., camera device 200) upon which any one or more of the methodologies herein discussed may be run. In alternative embodiments, the camera device 800 operates as a standalone device or may be connected (e.g., networked) to other devices. In a networked deployment, the camera device 800 may operate in the capacity of either a server or a client device in server-client network environments, or it may act as a peer device in peer-to-peer (or distributed) network environments. The camera device 800 may be a simple device that includes a portable personal computer (PC) (e.g., a notebook or a netbook), a tablet, an interactive console, a Personal Digital Assistant (PDA), a mobile telephone or smartphone, a web appliance, a network router, switch or bridge, or any device capable of executing instructions 824 (sequential or otherwise) that specify actions to be taken by that camera device 800. Further, while only a single device is illustrated, the term "device" shall also be taken to include any collection of devices that, individually or jointly, execute a set (or multiple sets) of instructions 824 to perform any one or more of the methodologies discussed herein.

The example camera device 800 includes a processor 802 (e.g., a central processing unit (CPU), a main memory 804 and/or a static memory 806, which communicate with each other via an interconnect 808 (e.g., a link, a bus, etc.). The camera device 800 may further include an input device 812 (e.g., a button or alphanumeric keyboard), and a user interface (UI) navigation device 814 (e.g., an integrated touchpad). The camera device 800 may additionally include mass storage 816 (e.g., a drive unit), a signal generation device 818 (e.g., a speaker), a network interface device 820, and a camera image sensor 828 (e.g., a CMOS/CCD sensor that converts an optical image into an electronic signal).

The mass storage 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the camera device 800, with the main memory 804, static memory 806, and the processor 802 constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions 824 for execution by the camera device 800 and that cause the camera device to perform any one or more of the methodologies of the present disclosure or that is capable of storing, encoding or carrying data structures utilized by or associated with such instructions 824. The term "machine-readable medium" shall, accordingly, be taken to include, but not be limited to, solid-state memories, optical media, and magnetic media. Specific examples of machine-readable media 822 include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks 826 include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions 824 for execution by the camera device 800, and includes digital or analog communications signals or other intangible medium to facilitate communication of such software.

Embodiments may be implemented in connection with wired and wireless networks, across a variety of digital and analog mediums. Although some of the previously described techniques and configurations were provided with reference to implementations of consumer electronic devices with wired or physically coupled digital signal connections, these techniques and configurations may also be applicable to display of content from wireless digital sources from a variety of local area wireless multimedia networks and network content accesses using WLANs, WWANs, and wireless communication standards. Further, the previously described techniques and configurations are not limited to input sources provided from a direct analog or digital signal, but may be applied or used with any number of multimedia streaming applications and protocols to provide display content over an input link.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a device (e.g., a computer or other processor-driven display device). For example, a machine-readable storage device may include read-only memory (ROM), random-access memory (RAM), magnetic disk storage media, optical storage media, flash-memory devices, and other storage devices and media. In some embodiments, camera devices 800 may be configured with instructions stored on such machine-readable storage devices.

What is claimed is:

1. An external flash device comprising:
   a housing;
   an attachment member for securing the housing to a camera device;
   a power source;
   an adjustable arm that is positionable with respect to the housing, wherein the adjustable arm includes an optical sensor for detecting an optical transmission emitted from the camera device; and
   a light emitting array supported within the housing, the light emitting array configured to produce a flash when activated in response to the optical sensor receiving an optical transmission from the camera device.

2. The external flash device of claim 1, further comprising a microprocessor configured to apply flash settings in response to the optical transmission.

3. The external flash device of claim 2, wherein the light emitting array produces a flash of a defined brightness level in response to the optical transmission.

4. The external flash device of claim 3, wherein the light emitting array includes a plurality of light emitting diodes.

5. The external flash device of claim 4, wherein respective diodes of the plurality of light emitting diodes transmit a different color temperature, and wherein the flash is generated to emit one or more of the color temperatures in response to the optical transmission.

6. The external flash device of claim 1, wherein the adjustable arm rotates and translates with respect to the housing in order to position the optical sensor over an internal camera flash of the camera device.

7. The external flash device of claim 1, wherein the flash is synchronized with an image capture of the camera device.

8. The external flash device of claim 1, further comprising a shield coupled to the adjustable arm that surrounds a flash of the camera device, the shield configured for arrangement relative to the camera device to block the optical sensor of the external flash device from receiving external light.

9. The external flash device of claim 1, wherein the attachment member is one of: adhesive, magnets, suction cups, or hook and loop fabric.

10. The external flash device of claim 1, further comprising a supplemental optical sensor to produce a measurement of ambient light, wherein the external flash device is configured to adjust color temperature and brightness of the flash produced from the light emitting array based on the measurement of ambient light.

11. The external flash device of claim 1, wherein the external flash device is configured to output the flash in a flash sequence, the flash sequence providing a strobe of multiple flashes.

12. A method of operation for an external flash device comprising:
    receiving, by an external flash device attached to a camera device, an optical transmission from an internal camera flash of the camera device;
    detecting the optical transmission from the camera device with an optical sensor located on an arm of the external flash device, the arm positioned over the transmission path of the optical transmission from the internal camera flash of the camera device; and
    activating one or more light emitting units in response to the optical transmission.

13. The method of claim 12, further comprising a microprocessor configured to decode the optical transmission and apply flash settings to the external flash device in response to the optical transmission.

14. The method of claim 13, wherein the one or more light emitting units are included in a light emitting array.

15. The method of claim 14, wherein the light emitting array produces a flash of a defined brightness level and a defined color temperature based on the flash settings.

16. The method of claim 12, wherein the arm is configured to receive a rotation and translation with respect to a housing of the external flash device in order to position the optical sensor over an internal camera flash of the camera device.

17. The method of claim 12, further comprising synchronizing a timing of a flash produced by the activating of the one or more light emitting units with an image capture of the camera device.

18. The method of claim 12, further comprising surrounding the optical sensor and a flash of the camera device with a shield to block light from accidentally activating the external flash.

19. The method of claim 12, wherein the external flash device is attached to the camera device with an attachment member.

20. An external flash device circuitry operable in an external flash device, the external flash device circuitry coupled to an optical sensor and a light emitting unit, wherein the light emitting unit comprises a light emitting array including one or more light emitting diode units, and wherein the external flash device circuitry is configured to perform operations that:
- process an optical transmission received at an optical sensor, wherein the optical transmission originates from a camera device;
- decode the optical transmission to determine flash settings to be applied to the external flash device;
- apply the flash settings to the external flash device in response to the optical transmission; and
- activate the light emitting unit of the external flash device in response to the optical transmission.

21. The circuitry of claim 20, wherein the light emitting array produces a flash with a specified light brightness level and specified color temperature according to the flash settings.

22. The circuitry of claim 20, wherein the activation of the light emitting unit is synchronized with an image capture of the camera device.

23. The circuitry of claim 20, wherein the external flash device is powered with a dedicated battery housed within the external flash device.

* * * * *